United States Patent
Serra et al.

(10) Patent No.: US 7,930,626 B2
(45) Date of Patent: Apr. 19, 2011

(54) DETERMINING A LOCATION FOR PLACING DATA IN A SPREADSHEET BASED ON A LOCATION OF THE DATA SOURCE

(75) Inventors: Bill Serra, Montara, CA (US); Salil Pradhan, Santa Clara, CA (US); Antoni Drudis, Saratoga, CA (US)

(73) Assignee: Hewlett-Packard Development Company L.P., Houston, TX (US)

( * ) Notice: Subject to any disclaimer, the term of this patent is extended or adjusted under 35 U.S.C. 154(b) by 1321 days.

(21) Appl. No.: 10/697,688

(22) Filed: Oct. 31, 2003

(65) Prior Publication Data

US 2005/0097447 A1 May 5, 2005

(51) Int. Cl.
G06F 17/20 (2006.01)
G06F 17/21 (2006.01)
(52) U.S. Cl. ......................................... 715/212; 702/85
(58) Field of Classification Search .................. 715/503, 715/504, 508, 517, 212; 702/85
See application file for complete search history.

(56) References Cited

U.S. PATENT DOCUMENTS

| | | | |
|---|---|---|---|
| 5,038,318 A | | 8/1991 | Roseman |
| 5,808,916 A | * | 9/1998 | Orr et al. ............................ 703/6 |
| 5,893,123 A | | 4/1999 | Tuinenga |
| 5,894,266 A | * | 4/1999 | Wood et al. .............. 340/539.17 |
| 5,926,822 A | | 7/1999 | Garman |
| 6,055,548 A | * | 4/2000 | Comer et al. ................. 715/503 |
| 6,138,130 A | * | 10/2000 | Adler et al. ................... 715/503 |
| 6,421,345 B1 | * | 7/2002 | Enoki et al. .............. 370/395.21 |
| 6,631,497 B1 | | 10/2003 | Jamshidi et al. |
| 6,665,611 B1 | * | 12/2003 | Oran et al. ..................... 701/213 |
| 6,701,485 B1 | * | 3/2004 | Igra et al. ...................... 715/503 |
| 6,742,162 B2 | * | 5/2004 | Bennett ......................... 715/503 |
| 6,779,151 B2 | | 8/2004 | Cahill et al. |
| 6,859,907 B1 | * | 2/2005 | McGarry ....................... 715/201 |
| 6,880,130 B2 | * | 4/2005 | Makowski et al. ........... 715/763 |
| 7,155,665 B1 | * | 12/2006 | Browne et al. ................ 715/243 |
| 2002/0091871 A1 | | 7/2002 | Cahill et al. |
| 2003/0144746 A1 | * | 7/2003 | Hsiung et al. ................... 700/28 |
| 2004/0221259 A1 | * | 11/2004 | Devore et al. ................. 717/102 |

FOREIGN PATENT DOCUMENTS

WO   WO 03/073313   9/2003

OTHER PUBLICATIONS

Jones et al.; "A User-Centered Approach to Functions in Excel"; Aug. 2003; pp. 165-175.*
Myers, Brad; "Graphical Techniques in a Spreadsheet for Specifying User Interfaces";1991;ACM;pp. 243-249.*
Seth et al.,"Demo Abstract: A Spreadsheet Toolkit for Streaming Sensor Data", 2005, ACM, pp. 313.*
Iwerks et al.,"Integrating the Natural Environment into a GIS for Decision Support", 1999, ACM, pp. 73-78.*
Boulis et al.,"Design and Implementation of a Framework for Efficient and Programmable Sensor Networks",2003, ACM, pp. 187-200.*
Bansler et al., "Technonlgy-Use Mediation:Making Sense of Electronic Communication in an Organizational Context", ACM, 2003, pp. 135-143.*
Moore, J et al—"A Sense of Place: Toward a Location-Aware Information Plane for Data Centers"—HP Technical Reports/HPL-2004-27—Feb. 23, 2004—pp. 1-12.

* cited by examiner

*Primary Examiner* — Doug Hutton
*Assistant Examiner* — James J Debrow (57) ABSTRACT

Data from a data source is received. A location in a spreadsheet is determined for placing at least a portion of the data from the data source based on location information for the data source.

32 Claims, 9 Drawing Sheets

VIEW LOCK
TOP VIEW
*FIG. 5*

FIELD OF VIEW

DETERMINING A LOCATION FOR PLACING DATA IN A SPREADSHEET BASED ON A LOCATION OF THE DATA SOURCE

TECHNICAL FIELD

This invention relates generally to spreadsheets. More particularly, the invention relates to determining locations in a spreadsheet for placing data.

BACKGROUND

Spreadsheet programs, such as LOTUS, QUATRO and EXCEL, are powerful tools commonly used for collecting, analyzing, and managing data in an efficient and expedient manner. Mathematical applications such as record-keeping, optimization analysis, calculations, charting and graphical analysis are examples of typical uses for spreadsheets.

Spreadsheet programs use spreadsheets for displaying and managing data. Spreadsheets typically include cells arranged in rows and columns. For example, the columns of a spreadsheet may be organized by letter, such as columns A, B, C, etc., and the rows may be organized by number, such as rows 1, 2, 3, etc. Each cell is identified by a combination of column letter and row number. Numerical and textual data can be entered into the cells of the spreadsheet according to the organization imposed by the end user. Also, the cells can be formatted to present the numbers and text in a desired appearance.

In addition to entering data in individual cells, conventional spreadsheet programs also permit the end user to define mathematical functions within individual cells. It is common for the mathematical functions entered in one cell to use data contained in other cells. The function itself is not displayed in the cell. Instead, the cell displays the results of the function.

Typically, several well-used functions are defined by the spreadsheet program. For example, summation of cells in a column may be represented by "=SUM(A3:A5)". The end user may type this function in cell A6, which results in cell A6 displaying the sum of the data contained in cells A3-A5. Instead of using a predefined function, the end user may type "=A3+A4+A5" in the cell A6 to achieve the same result.

Conventionally, a spreadsheet program creates a dependency tree for the cells and resolves mathematical functions (i.e., equations) for each cell in a linear sequence. For example, assuming cell A6 is the sum of cells A3-A5, if the value in any of the cells A3-A5 changes, the spreadsheet program recalculates the sum and the value in cell A6 changes. The recalculation of a cell is only performed when one of its dependent cells, such as cells A3-A5, changes. When there are no changes in the spreadsheet, no recalculations are performed. However, this conventional recalculation technique precludes the recalculation of the spreadsheet at regular intervals. Also, in environments where time-dependent circular references are desirable, such as sensor-driven control systems where actions are taken after aggregating sensor data and time-dependent variables, the use of a spreadsheet for managing and controlling the system is generally not feasible due to the lack of support for circular, time-dependent, references.

In addition, a spreadsheet provides a tool for analyzing and managing data. However, the spreadsheet provides limited information about data sources supplying data to the spreadsheet unless the information is input into the spreadsheet. When a large amount of data is being managed, it is costly and time consuming to input information about the data sources in the spreadsheet.

SUMMARY OF THE EMBODIMENTS

According to an embodiment, a method includes receiving data from a data source and determining a location in a spreadsheet for placing at least a portion of the data based on location information for the data source.

According to another embodiment, a method of using a spreadsheet to display information at locations in the spreadsheet associated with the origin of the information includes receiving data from a plurality of sensors. The method further includes determining locations in the spreadsheet associated with locations of the plurality of sensors. One or more of at least a portion of the data from each of the plurality of sensors and a value is operable to be displayed in one or more of the locations in the spreadsheet, wherein the value is calculated from at least some of the data from the plurality of sensors.

According to yet another embodiment, a system includes a plurality of data sources and a computing platform operable to determine locations in a spreadsheet associated with locations of the plurality of data sources. At least one of the data from the plurality of sensors and a value calculated from the data from one or more of the plurality of sensors may be displayed at the locations in the spreadsheet.

According to yet another embodiment, an apparatus includes means for receiving data from a plurality of sensors and means for determining locations in a spreadsheet associated with locations of the plurality of sensors. At least a portion of the data from each of the plurality of sensors may be displayed at the locations in the spreadsheet. Also, a value calculated from the data from one or more of the plurality of sensors may be displayed at one of the determined locations in the spreadsheet.

According to yet another embodiment, a computer readable medium on which is embedded a program is provided. The program performs a method, and the method includes receiving data from a data source and determining a location in a spreadsheet for placing at least a portion of the data based on location information for the data source.

BRIEF DESCRIPTION OF THE DRAWINGS

The present invention is illustrated by way of example and not limitation in the accompanying figures in which like numeral references refer to like elements, and wherein.

DETAILED DESCRIPTION OF EMBODIMENTS

According to an embodiment of the invention, a spreadsheet manager is provided that interacts with a spreadsheet program to manage data from one or more data sources. The spreadsheet manager receives data from the data sources and channels the data to cells in a spreadsheet to provide a spatial representation of the data using the spreadsheet. Location information for the data sources is used to determine locations, such as the locations of cells, in the spreadsheet for placing the data from the data sources. Thus, the spreadsheet manager correlates the locations of the data sources and the layout of the data in the spreadsheet such that a user viewing the spreadsheet may generally determine the origin of the data in the spreadsheet.

According to an embodiment of the invention, the spreadsheet manager is operable to perform time-related mathematical functions using the data from the data sources. Conventional spreadsheets can perform mathematical functions that are not time related, such as summation, etc. The spreadsheet manager, for example, may use cells to simulate a timer or clock. Also, mathematical functions may be performed based on the clock.

According to another embodiment of the invention, a spreadsheet is used as a programming platform to control one or more devices. For example, based on data in one or more cells in the spreadsheet, a device may be directed to perform an action. Conventional spreadsheets resolve mathematical functions for cells in a linear sequence, wherein calculations are performed in response to a change in value for a dependent cell. The spreadsheet manager provides the ability to resolve mathematical functions as a function of time, rather than or in addition to linearly. Thus, calculations may be performed at regular intervals. This increases the feasibility of using the spreadsheet as a programming platform for sensor-driven control systems, where actions are taken after aggregating sensor data and time-dependent variables.

Figure 1:
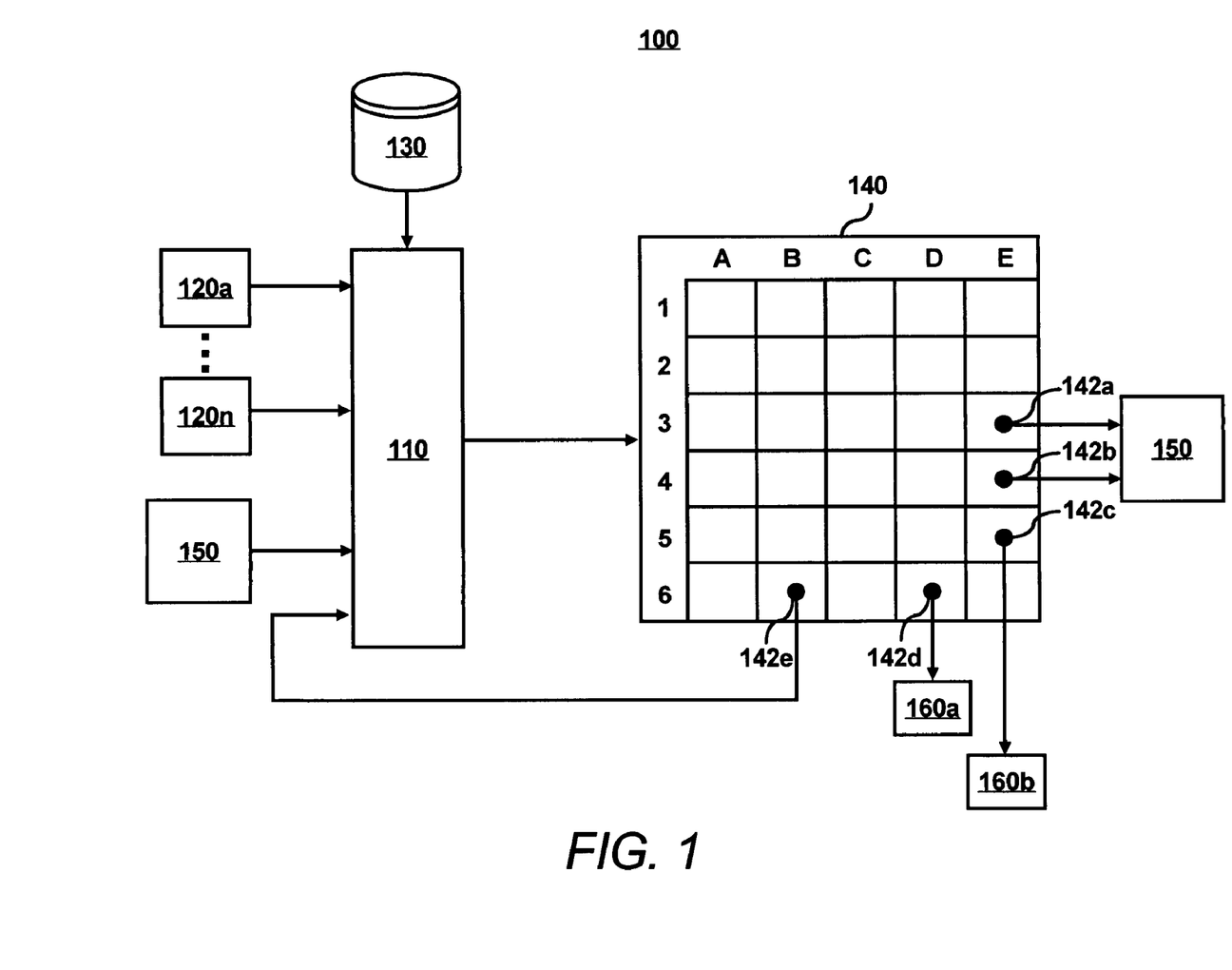
FIG. 1 illustrates a block diagram of a system, according to an embodiment of the invention.

FIG. 1 illustrates a system 100, according to an embodiment of the invention. The system 100 includes spreadsheet manager 110. The spreadsheet manager 110 is connected to data sources 120a-n, a configuration repository 130, and a spreadsheet program generating the spreadsheet 140. The spreadsheet manager 110 receives data from the data sources 120a . . . n. In one embodiment, the data sources 120a . . . n may include sensors and data received from other spreadsheets, but the data sources 120a . . . n may include substantially any source of data.

The spreadsheet manager 110 determines location information associated with the location of each of the data sources 120a . . . n in a geographical area. Based on the location information for the data sources 120a . . . n, the spreadsheet manager 110 determines locations in the spreadsheet for displaying data from the data sources 120a . . . n. For example, data 142a-e in the spreadsheet 140 represents data received from the data sources 120a-e or calculated from the data sources 120a-e. The locations of the data 142a-e in the spreadsheet 140, such as cells B6, D6, and E3-E5, are associated with the location information for the data sources 120a-e. Thus, a user viewing the spreadsheet 140 may quickly identify data associated with a particular area and possibly whether there is a problem associated with the area based on the data displayed in the spreadsheet 140 and the location of the data displayed in the spreadsheet 140. For example, the geographical area may include a data center, and the data sources may include sensors in the data center. The spreadsheet manager 110 transmits the data from the sensors and cell locations for placing the data in the spreadsheet to the spreadsheet program for generating a display of the data. The data from the data sources 120a . . . e transmitted to the spreadsheet program may include at least a portion of the data received from the data sources 120a . . . e. For example, if the data sources 120a . . . e are sensors measuring temperature, the measured temperatures, sensor id's, location information, etc. may be transmitted from the sensors. A portion of the data, such as the measured temperatures, received from the sensors may be transmitted to the spreadsheet program for display in the spreadsheet at determined cell locations. The cell locations are associated with the location information for the sensors. Thus, a user viewing the data in the spreadsheet may generally determine where in the data center the sensor providing the data is located. Thus, if the sensor data indicates a problem, the problem and the general location of the problem in the data center may be quickly identified from the spreadsheet 140.

The location information for the data sources 120a . . . n may be related to physical locations in a geographical area. A geographical area may be substantially any size. For example, a geographical area may be a room comprising a data center or the geographical area may be region of a country. Location information for the data source 120a may be a location in a Cartesian coordinate space encompassing the geographical area, such as a data center. Also, location information may be calculated based on approximate distance to a predetermined point. For example, the locations of the data source 120b . . . n may be based on their respective distances to the data source 120a. These and other techniques may be used to generate location information for the data sources 120a . . . n. Location information may be automatically determined by location sensors (not shown) associated with the data sources 120a . . . n and transmitted to the spreadsheet manager 110 where the location information may be stored in the configuration repository 130. Location sensors may include GPS sensors or other known devices for determining location. Also, the location information may be manually determined and stored in the configuration repository 130.

The spreadsheet manager 110 maps the location information for the data sources 120a . . . n to locations in the spreadsheet 140. In one embodiment, locations for placing data from the data sources 120a . . . n in the spreadsheet 140 are stored in the configuration repository 130. Each of the data sources 120a . . . n is operable to transmit data including a data source id identifying the data source transmitting the data. The spreadsheet manager 110 retrieves from the configuration repository 130 locations in the spreadsheet 140 for placing the data from the data sources. For example, the spreadsheet manager 110 receives data from the data source 120a and retrieves a location for placing the data in the spreadsheet 140. The id for the data source 120a may be used to determine a spreadsheet location for the data 142a from the data source 120a. The retrieved location (e.g., cell E3), which is based on the location information for the data source 120a, is the location where the data 142a is placed in the spreadsheet 140. According to another embodiment of the invention, the spreadsheet manager 110 can facilitate the generation of different views of the data received from the data sources 120a . . . n. For example, the spreadsheet 140 shown in FIG. 1 may be a representation of all the data received from the data sources 120a . . . n. Instead of viewing all the data from the data sources 120a . . . n, the user may desire to view data for data sources in a particular area. The spreadsheet manager 110 can facilitate the generation of multiple views of the data, each view referred to as a field of view. Each field of view may be associated with a particular area that encompasses a subset of the data sources 120a . . . n. Generation of different fields of view is described in further detail below with respect to FIGS. 5 and 6.

According to another embodiment of the invention, the spreadsheet 140 may be used as a programming platform for controlling devices. For example, devices 160a and 160b are controlled based on the values of the data 142c and 142d in the spreadsheet 140. Cells E5 and D6 containing the data 142c and 142d effectively become sensors. Based on the output of the sensors, i.e., the values of the data 142c and 142d, the spreadsheet manager 110 may direct the devices 160a and 160b to perform an action. Referring to the data center example, if the values of the data 142c and 142d represent high temperatures measured by temperature sensors in the data center, the spreadsheet manager 110 may direct the devices 160a and 160b, e.g., cooling fans or blowers, to increase air flow to the area where the data sources 120d and 120e are located.

The spreadsheet manager 110 may also facilitate linking multiple spreadsheets. Cells in the spreadsheet 140 may be used as data sources providing data for other spreadsheets. For example, the cells E3-E4 are data sources for the spreadsheet 150. The data 142a and 142b in the cells E3-E4 may be placed in the spreadsheet 150 and/or used to calculate other data placed in the spreadsheet 150. Also, cells in the spreadsheet 150 may function as sensors connected to the spreadsheet manager 110. For example, the spreadsheet manager 110 may control the device 160a based on the data 142d in the cell D6 of the spreadsheet 140 and data in a cell in the spreadsheet 150.

According to another embodiment, the spreadsheet manager 110 can perform time-related mathematical functions on the data from the data sources 120a . . . n. Conventionally, spreadsheet programs can perform mathematical functions on data in the spreadsheet. However, the mathematical functions do not encompass time-related functions. For example, conventional spreadsheets cannot emulate a timer or counter. The spreadsheet manager 110 is operable to perform time-related functions, which may be used to control the devices 160a and 160b. For example, the spreadsheet manager 110 may emulate a counter in one of the cells in the spreadsheet 140. The counter may be used for a variety of functions, such as to determine when a predetermined amount of time has passed in order to determine when to perform a mathematical function or when to control one of the devices 160a or 160b.

Figure 2:
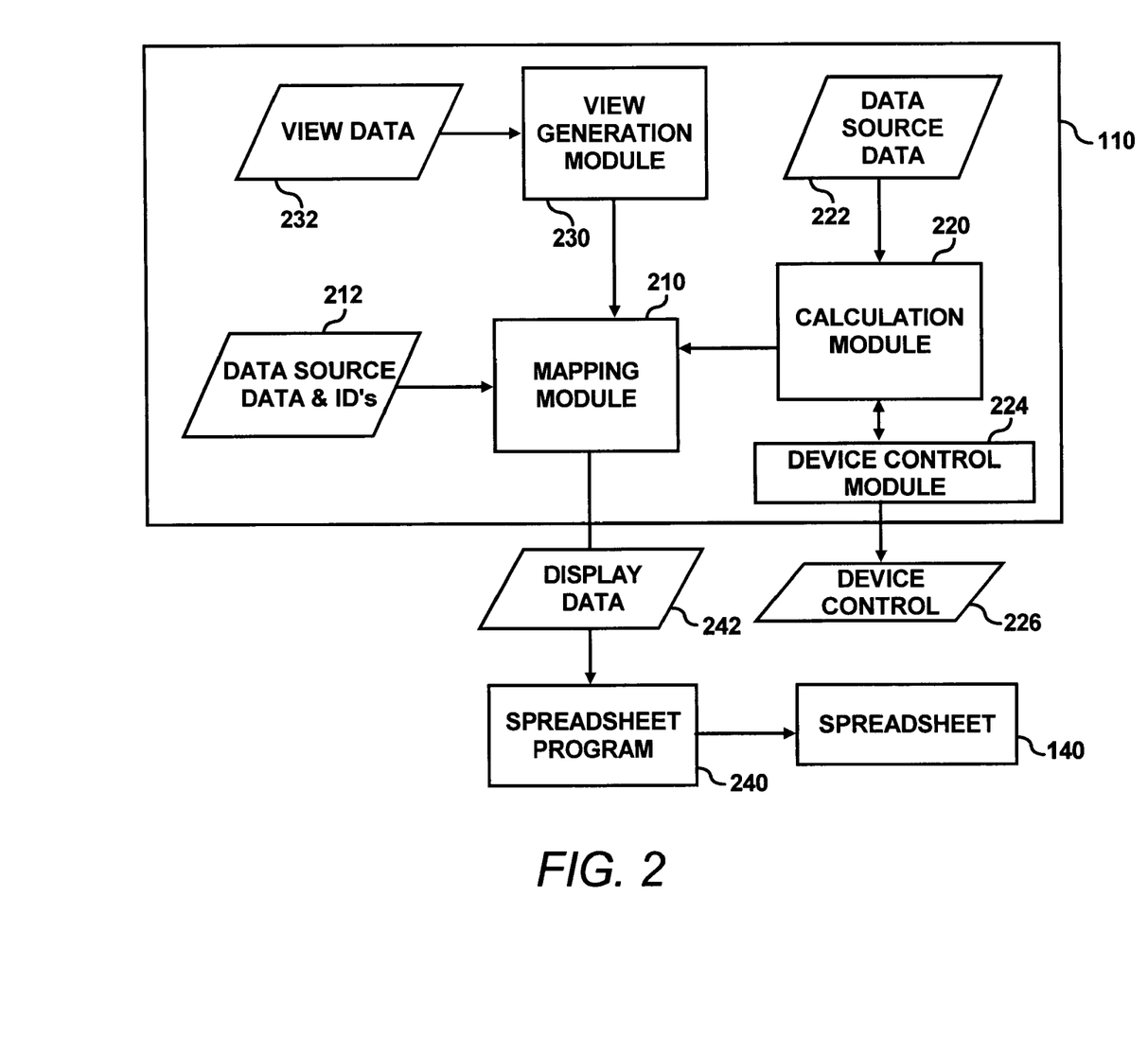
FIG. 2 illustrates a software architecture of a spreadsheet manager, according to embodiments of the invention.

FIG. 2 illustrates generalized software architecture for the spreadsheet manager 110. The software architecture includes a mapping module 210, a calculation module 220, and a view generation module 230. According to an embodiment of the invention, the mapping module 210 receives data source data 212 from data sources, such as the data sources 120a . . . n shown in FIG. 1. In one embodiment, the data source data 212 may include id's and/or location information for each of the data sources 120a . . . n transmitting data. Based on the data desired to be viewed by the user, the mapping module 210 retrieves locations, such as cell locations for placing the data source data 212 in the spreadsheet 140. The locations in the spreadsheet 140 are associated with the location information for the data sources 120a . . . n to provide a spatial representation of the data, which may be used to quickly determine an approximate origin of the data. In another embodiment, the data source data 212 may also include location information. The location information for a data source is used to retrieve a location from the configuration repository 130 for placing data from that data source in the spreadsheet 140.

The mapping module 210 is connected to the calculation module 220 for placing data in the spreadsheet 140 resulting from performing time-related and/or non-time-related mathematical functions on data source data 222. The calculation module 220 may perform mathematical functions on the data source data 222 received from the data sources 120a . . . n. The data source data 222 may include the data source data 212 received from the data sources 120a . . . n without id's or location information, such as measurement data generated by a sensor.

The calculation module 220 may perform time-related and/or non-time-related mathematical functions. For example, the calculation module 220 may compare the value of data from a particular source to a threshold. If the threshold is exceeded for a predetermined period of time, then an action is performed. The action may be performed by the device control module 224, such as represented by the device control data 226 generated by the device control module 224. For example, the device control module 224 may instruct the device 160a shown in FIG. 1 to perform an action that causes the data to fall below the threshold. Another example may include activating an alarm in response to the data exceeding the threshold for a predetermined period of time. In the data center embodiment, shown in FIG. 3A, the device control module may instruct a cooling system component 360a, such as a blower or pump, to increase the amount of cooling fluid supplied to cool a computer system in response to sensing an excessive temperature for a predetermined period of time.

Figure 5:
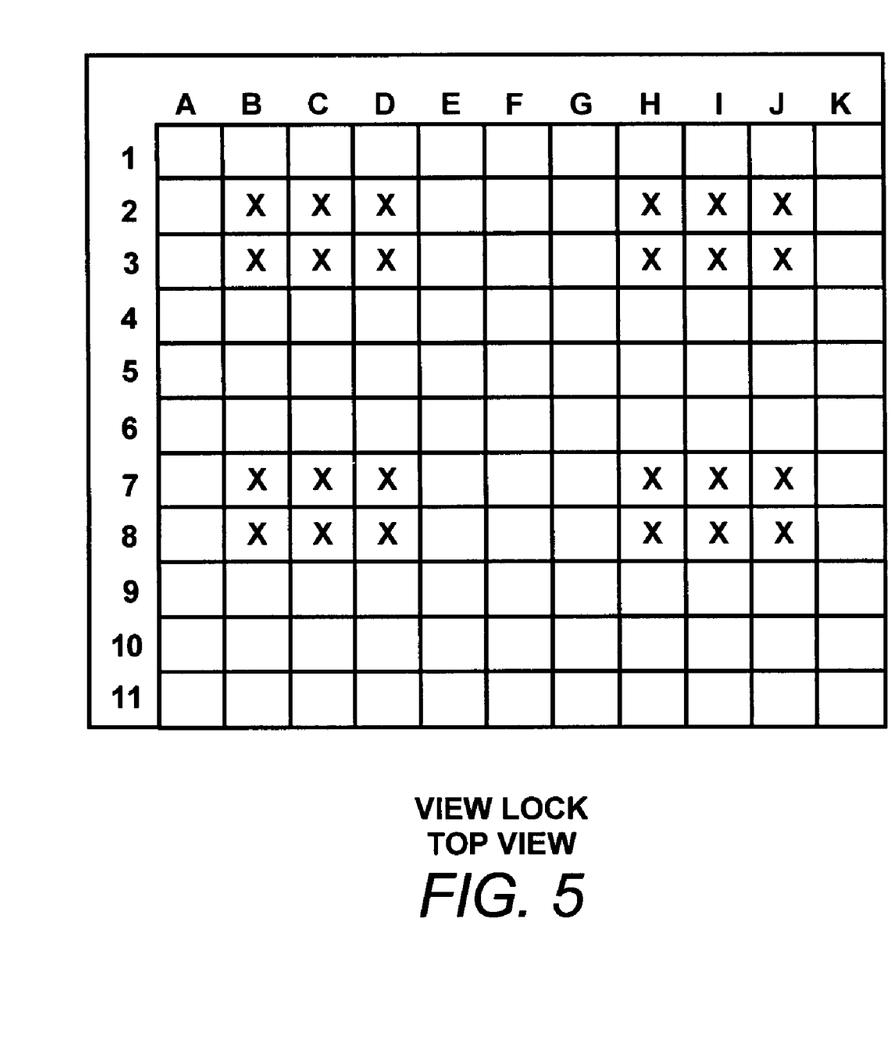
FIG. 5 illustrates a view lock view in a spreadsheet, according to an embodiment of the invention.

The mapping module 210 is also connected to the view generation module 230 for determining a view of the data source data 212 to be displayed in the spreadsheet 140. The view generation module 230 receives view data 232. The view data 232 may include a selection of the type of view to be displayed in the spreadsheet 140. The spreadsheet manager 110 may generate at least two types of views of the data source data 212. A first type, referred to as view lock, includes a display of the data source data 212 received from substantially all the data sources 120a . . . n. FIG. 5 illustrates an example of a view lock view including data for substantially all the data sources, such as the temperature sensors 320, in the data center 300 shown in FIG. 3A.

Figure 3A:
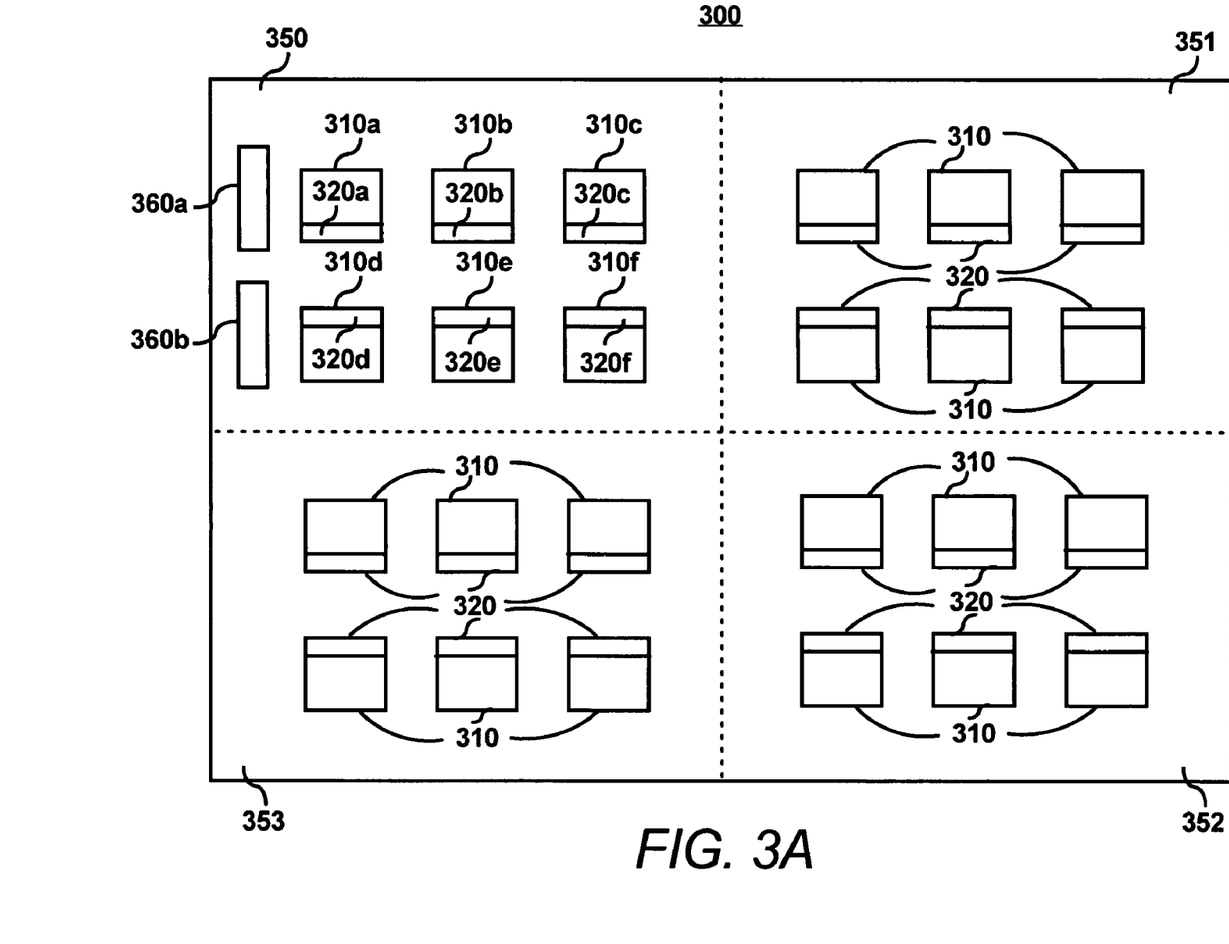
FIG. 3A illustrates a data center, according to an embodiment of the invention.

A second type of view, referred to as field of view, includes a display of the data source data 212 received from at least a subset of the data sources 120a . . . n. The field of view may be from the perspective of a user viewing the data sources 120a . . . n from a point in the geographical area where the data sources 120a . . . n are located. This is further illustrated with respect to FIGS. 3A and 6. FIG. 3A illustrates a geographical area including the data center 300. FIG. 3A is a top view of the data center 300. The data center 300 includes a plurality of racks 310 and a plurality of data sources, which in this example comprise temperature sensors 320 monitoring temperatures at the racks 310. The racks 310 house computer systems and other components generating a significant amount of heat. The temperature sensors 320 are included in a cooling system that removes heat dissipated by the computer systems to maintain the temperature in the vicinity of the computer systems at acceptable levels that optimize performance of the computer systems. The cooling system may include blowers 360a and 360b supplying cooling fluid, such as air, to the racks 310 in the section 350 and/or other sections in the data center 300. A rack and the cooling system are described in further detail below with respect to FIG. 3B, which illustrates a rack, and FIG. 4, which illustrates a system including a cooling system.

The geographical area, which is the data center 300, may be divided into sections 350-353. In this example, the sections 350-353 are divided along the x-axis and the y-axis. However, the sections may be also divided along the z-axis. For example, several sections may be provided directly below the sections 350-353 along the z-axis, which are hidden from the top view of the data center 300 shown in FIG. 3A. If one or more of the racks 310 include several sensors located along the vertical or z-axis of the racks 310, then the data center may be divided along the z-axis such that the spreadsheet manager 110 can generate a field of view in the spreadsheet 140 including data from temperature sensors 320 provided in a particular x-y plane of the data center 300. In one embodiment, the spreadsheet 140 may include multiple worksheets to represent views of sections divided along the z-axis. Thus, the view data 232 may include a user selection of the desired view type. If the selected view type includes a field of view, a section of the geographical area is selected. Then, a field of view including data from the data sources in the selected section is generated in the spreadsheet 140.

In one embodiment, a user may select a view type using a graphical user interface. For example, a representation of the data center may be displayed on the user's computer screen, and the user navigates through the data center using an input device, such as joystick, similarly to a video game. The user may select a view to be displayed in the spreadsheet 140 when the user navigates to a section of the data center of interest. In other embodiments, a user may select view type by inputting a selection of the view type and other information associated with the view type if needed in an interface. The interface may be a conventional-type interface.

Figure 6:
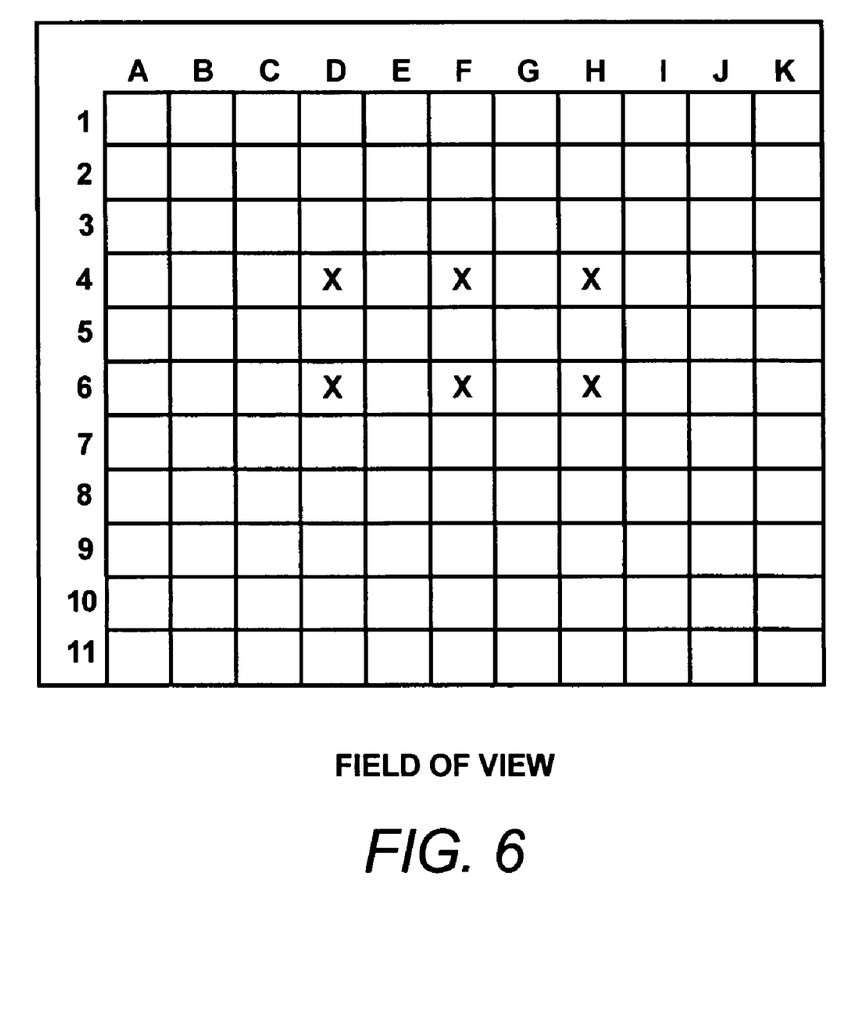
FIG. 6 illustrates a field of view in a spreadsheet, according to an embodiment of the invention.

FIG. 6 illustrates an example of a field of view display in the spreadsheet 140 for the section 350 of the data center 300 shown in FIG. 3A. The field of view includes data from the temperature sensors 320a-f in the section 350.

As described above, the mapping module 220 maps data from the data sources to locations in the spreadsheet. Table 100 below may be used in one embodiment for mapping data to cells in the spreadsheet 140 based on the location information for the data sources and the selected view.

TABLE 100

|   | VIEW TYPE | SECTION | ID | LOCATION | DATA |
|---|---|---|---|---|---|
| 1 | View Lock |  | ID320a | B2 | 80 |
| 2 | View Lock |  | ID320b | C2 | 78 |
| 3 | View Lock |  | ID320c | D2 | 82 |
| 4 | View Lock |  | ID320d | B3 | 100 |
| 5 | View Lock |  | ID320e | C3 | 81 |
| 6 | View Lock |  | ID320f | D3 | 79 |
|  | . | . | . | . | . |
|  | . | . | . | . | . |
|  | . | . | . | . | . |
| 7 | FOV | 350 | ID320a | D4 | 80 |
| 8 | FOV | 350 | ID320b | F4 | 78 |
| 9 | FOV | 350 | ID320c | H4 | 82 |
| 10 | FOV | 350 | ID320d | D6 | 100 |
| 11 | FOV | 350 | ID320e | F6 | 81 |
| 12 | FOV | 350 | ID320f | H6 | 79 |

Table 100 is an example of a lookup table that may be stored in the configuration repository 130 shown in FIG. 1. The mapping module 210 shown in FIG. 2 may be populated with data received from the data sources 320. The data column (i.e., the last column in table 100) includes examples of data that may be transmitted from the temperature sensors 320 in the data center 300 shown in FIG. 3A. Particularly rows 1-6 include temperature data from the temperature sensors 320a-f. Although not shown, the table 100 may include data from all the temperature sensors 320. The spreadsheet manager 110 receives the data source data and id's 212 from the temperature sensors 320, such as shown in FIG. 2. The mapping module 210 stores the received data in the table 100, for example, using the id's. The mapping module 210 retrieves data from the table 100 based on the view selected by the user.

In addition to the data from the temperature sensors 320, the table 100 may also store id's for the temperature sensors 320 and spreadsheet locations for placing data in the spreadsheet 140. The spreadsheet locations correspond to the location information for the temperature sensors 320. The spreadsheet locations may be predetermined based on the view selected by the user. Rows 1-6 include locations in the spreadsheet 140 for placing data from the temperature sensors 320a-f for the view lock view, such as shown in the view lock view of FIG. 5. For example, the data received from the temperature sensor 320a is placed in cell B2 if the view lock view is selected by the user; the data received from the temperature sensor 320b is placed in cell C2 for the view lock view, etc.

Rows 7-12 of the table 100 include locations for placing data in the spreadsheet 140 if the field of view is selected by the user for the section 350 of the data center 300. FIG. 6 illustrates the field of view for the section 350. The mapping module 210 retrieves the locations and data from rows 7-12 for placement in the spreadsheet 140 if this field of view is selected.

The mapping module 210 transmits the data and locations retrieved from the table 100, shown as the display data 242 in FIG. 2, to the spreadsheet program 240 for displaying the data in the spreadsheet 140, such as shown in FIGS. 5 and 6.

The table 100 illustrates examples of placing data received from sensors. It will be apparent to one of ordinary skill in the art that the table 100 may include other information. For example, the calculation module 220 of FIG. 2 may place data in the spreadsheet 140, such as the results of performing a mathematical function on data received from the sensors. The table 100 may also include location information received from sensors or predetermined location information for the sensors.

Figure 3B:
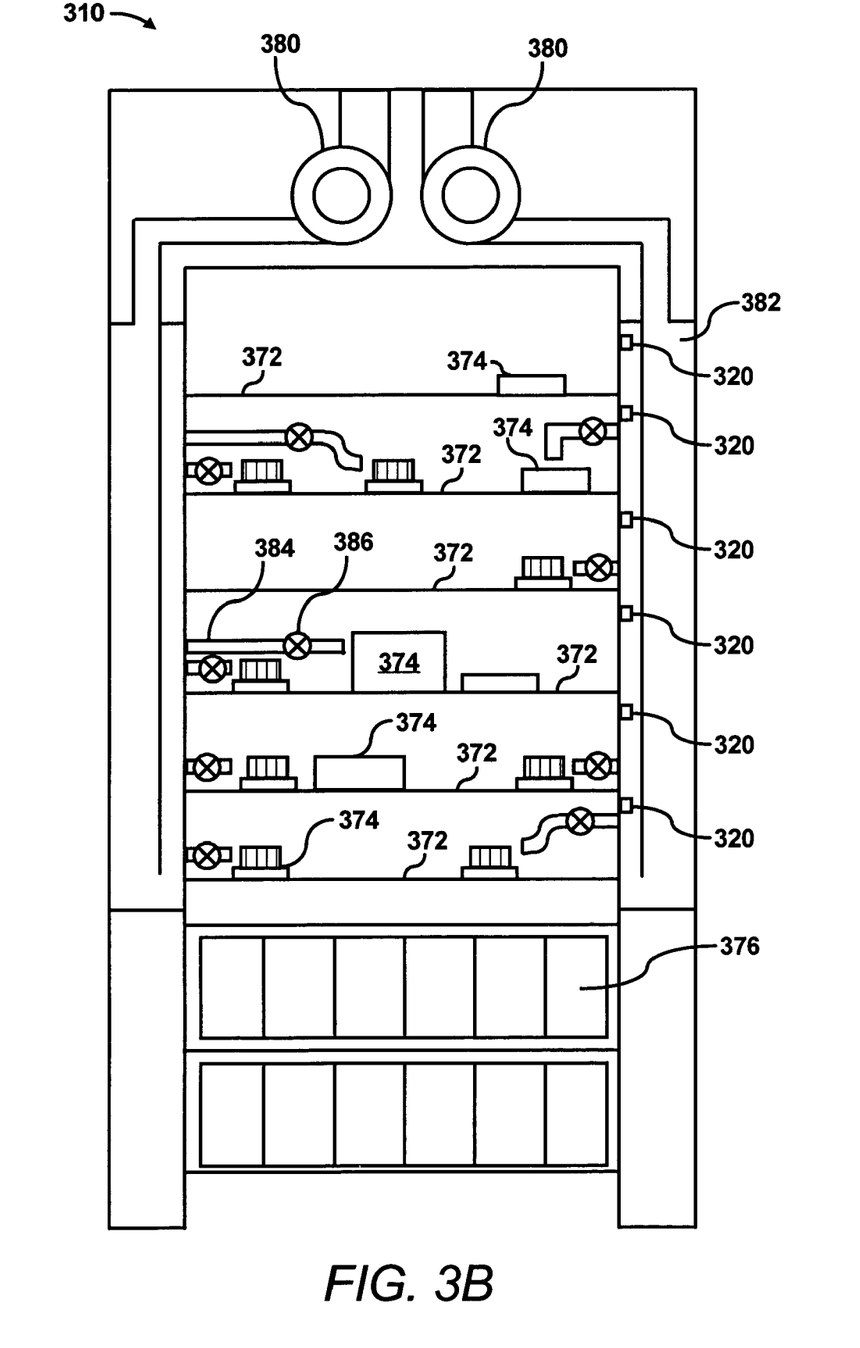
FIG. 3B illustrates a rack that may be used in the data center, according to an embodiment of the invention.

FIG. 3B illustrates a rack 310 according to an embodiment of the invention that may be used in the data center 300 to house computer systems. FIG. 3B is a cross-section of the rack 310. The rack 310 houses computer systems 372. The rack 310 is shown as housing five computer systems 372. It will be apparent to one of ordinary skill in the art that the rack 310 may be designed to house a much larger number of computer systems. A conventional rack may house upwards of 40 computer systems.

The computer systems 372 may include components 374. The computer systems 372 may include servers, storage devices, etc., such as known in the art, and the types of components 374 may vary depending on the type of computer system. A power system 376 is shown for conditioning and supplying power to the computer systems 372.

The computer systems 372 tend to dissipate a substantial amount of heat that can affect the operation of the components 374. The components 374 may be designed to operate in an environment maintained below a predetermined temperature. Accordingly, cooling components may be used to supply cooling fluid to the computer systems 372 for maintaining an optimum operation temperature.

In this embodiment, the rack 310 includes a plurality of blowers 380 operable to draw cooling fluid (e.g., air) from outside the rack 310 and deliver the cooling fluid to the space within the rack 310. The blowers 380 may include variable speed blowers operable to vary the amount of cooling fluid delivered to the components within the rack 310 based on measured heat dissipation of the components 374 in the computer systems 372. The blowers 380 may comprise any reasonably suitable blower that is capable of varying the amount of fluid delivered to the space. The choice of the blowers 380 may depend upon a plurality of factors, e.g., cooling requirements, costs, operating expenses, etc. Also, the number of blowers implemented may vary according to cooling needs of the system. According to an embodiment, at least two blowers 380 are implemented to enable a redundant fluid supply, in the event that one of the blowers malfunctions. In addition, at least two blowers may be provided to deliver fluid to both sides of the rack 310. In this respect, cooling fluid may be substantially simultaneously delivered through both sides of the rack 310.

The outlets of the blowers 380 are in fluid communication with a plenum 382. The plenum 382 is in fluid communication with a plurality of nozzles 384. The nozzles 384 have a first end and a second end, in which the first end is connected to the plenum 382. The second ends of the nozzles 384 are configured to output fluid from the blowers 380 to one or more heat generating components 374 of the computer systems 372. The cooling fluid supplied by the blowers 380, having been relatively heated by the heat generating components 374, may be expelled outside the rack 310. The cooling components included in the rack 310 are one example of a system for cooling the computer systems 372. Other known cooling systems may be implemented in the rack 310 to cool the computer systems 372. For example, liquid cooling systems utilizing pumps may be used to supply cooling fluid to the computer systems 372 to remove the heat dissipated by the computer systems 372.

The rack 310 may also include a plurality of temperature sensors 320. In one embodiment, the plurality of sensors 320 may be placed along the z-axis of the rack 310. The temperature sensors 320 may transmit measured temperatures to the spreadsheet manager 110 shown in FIG. 2. The temperature sensor data from the temperature sensors 320 may be displayed in the spreadsheet 140 in a view. According to an embodiment, the temperature sensor data from the temperature sensors 320 shown in FIG. 3B may be displayed in the spreadsheet 140 in a single cell. The measured temperatures may be totaled and displayed in a single cell. For example, referring to the field of view shown in FIG. 5, the data in the cell D4 may be a total of the temperatures detected by the temperature sensors 320 on the rack 310 shown in FIG. 3B. Alternatively, each of the temperatures may be contained in a distinct cell. Also, multiple worksheets in the spreadsheet 140 may be used to represent views of sections divided along the z-axis. For example, FIG. 6 includes a field of view of the data from the temperature sensors 320 in the section 350 of the data center 300 shown in FIG. 3A. These temperature sensors 320 may include temperature sensors 320 that are approximately in the same x-y plane as the temperature sensor 320 near the top of the rack 310 shown in FIG. 4. This field of view may be generated in a first worksheet of the spreadsheet 140. Other worksheets may be used to provide a field of view for the sensors 320 in the section 350 that are on different x-y planes.

Figure 4:
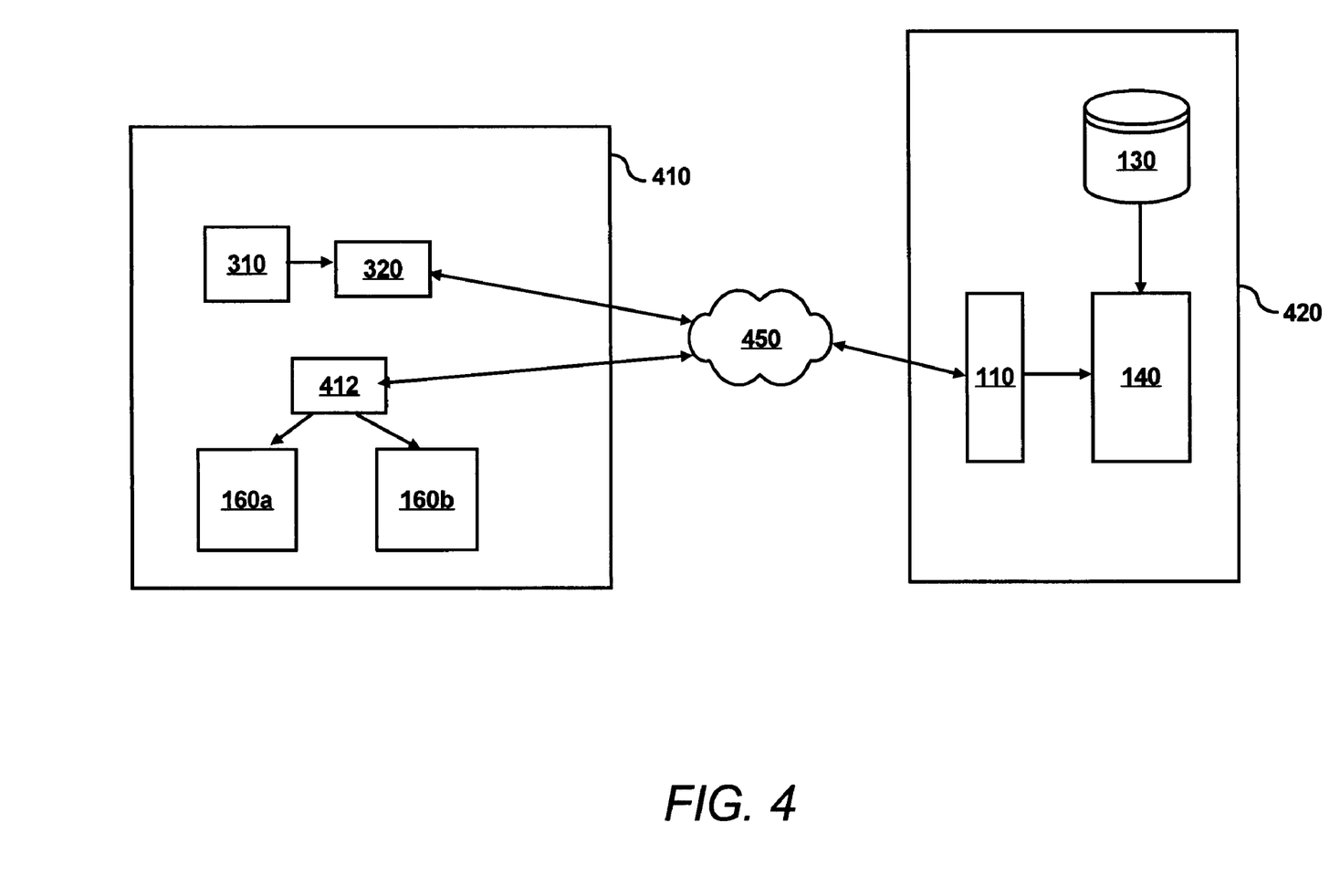
FIG. 4 illustrates a block diagram of another system, according to an embodiment of the invention.

FIG. 4 illustrates a system 400 according to an embodiment of the invention. The system 400 is similar to the system 100 shown in FIG. 1. The system 400 includes a spreadsheet server 420 including the spreadsheet manager 110 and the configuration repository 130. The configuration repository 130 may also be remotely located from the spreadsheet server 220. The spreadsheet manager 110 facilitates the generation of views of data, such as described above, in the spreadsheet 140.

The system 400 also includes a cooling system 410, which may be used in the data center 300 shown in FIG. 3. The cooling system 410 includes temperature sensors 320, such as the temperature sensor shown in FIGS. 3A and 3B measuring temperatures in the vicinity of the computer systems 310. The computer systems 310 may be housed in racks, such as shown in FIG. 3B. The temperature sensors 320 transmit measured temperatures to the spreadsheet manager 110, for example, via a network 450. The spreadsheet manager 110 facilitates the generation of views of the temperature sensor data in the spreadsheet 140.

The spreadsheet manager 110 may also control the devices 160a and 160b based on the temperature sensor data received from the temperature sensors 320. For example, if the temperature in the vicinity of one of the computer systems 310 exceeds a threshold for a predetermined period of time, the spreadsheet manager 110 may instruct a controller 412 in the cooling system 410 to increase the amount of cooling fluid being supplied to the computer system. For example, the devices 160a-b may include blowers, such as the blowers 360 and 360b shown in FIG. 3A supplying cooling fluid to one or more sections of the data center 300 or the blowers 380 shown in FIG. 3B providing localized cooling to a rack. The controller 412 may instruct the blower (e.g., the device 160a), which is operable to supply cooling fluid to the computer system dissipating an excessive amount of heat, to increase its speed resulting in lowering the temperature in the vicinity of the computer system.

Figure 7:
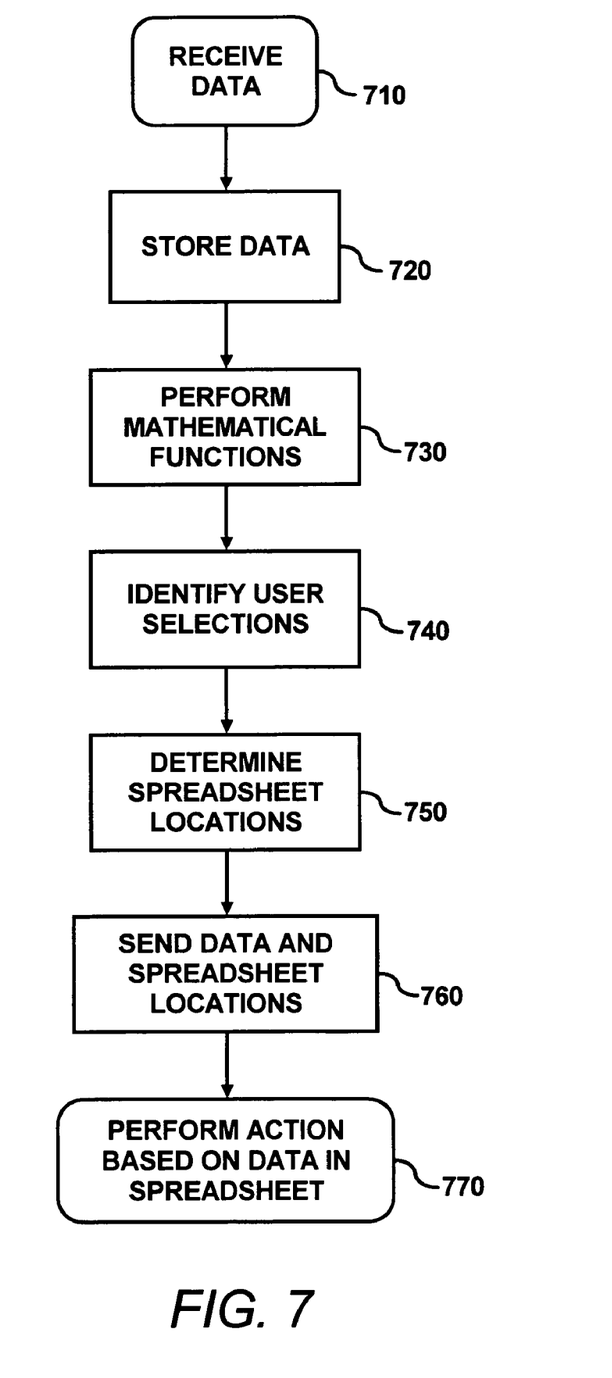
FIG. 7 illustrates a flow chart of a method for generating a view of data in a spreadsheet, according to an embodiment of the invention.

FIG. 7 illustrates a method 700 for generating a view of data received from data sources, according to an embodiment of the invention. The method 700 is described with respect to FIG. 3A by way of example and not limitation. Furthermore, the steps of the method 700 may be performed by software, hardware or a combination thereof. At step 710, the spreadsheet manager 110 receives data from the temperature sensors 320. The data includes temperatures sensor data, such as temperatures measured by the temperatures sensors 320. The data may also include an id identifying the sensor transmitting the data. In one embodiment, the data may also include location information identifying the location of the temperature sensor in the data center. For is example, each temperature sensor 320 may store location information identifying its location and the location information is transmitted to the spreadsheet manager 110 with the temperature sensor data. Location information may be predetermined and stored in the temperature sensors 320 for transmission to the spreadsheet manager 110. Alternatively, separate location sensors (not shown) may be used with the temperature sensors 320 to determine location information for each of the temperature sensors 320. In another embodiment, the location information for the temperature sensors 320 is predetermined, and stored, for example, in the configuration repository 130 shown in FIG. 1.

At step 720, the spreadsheet manager 110 stores the data received from the temperature sensors 320 in the configuration repository 130. In one embodiment, a table, such as the table 100 is populated with the temperature sensor data. Temperature sensor ids and/or location information may be used to determine where to store temperature sensor data in the table 100.

At step 730, the spreadsheet manager 110 performs mathematical functions on the temperature sensor data. For example, the calculation module 220 shown in FIG. 2 may aggregate temperature sensor data for temperature sensors in close proximity. The calculation module 220 may compare temperature sensor data to a threshold. The calculation module may also perform time-related mathematical functions, such as determining whether the threshold is exceeded for a predetermined period of time. In one embodiment, the mathematical functions are pre-programmed. For example, the calculation module 220 may comprise code for performing the mathematical functions. Also, the results of the mathematical functions may be displayed in the spreadsheet 140.

At step 740, the spreadsheet manager 110 identifies user selections associated with generating a view of the data received from the temperature sensors 320. User selections may include a selection of the type of view, such as view lock or field of view. If field of view is selected then a section, such as one of the sections 350-353, in the data center 300 is selected for identifying the temperature sensor data to be included in the field of view. Other user selections may include whether the temperature sensor data included in the view is an aggregate of temperature sensor data for sensors in close proximity (e.g., temperature sensors on one rack) or data for each temperature sensor.

At step 750, the spreadsheet manager 110 determines locations for placing the temperature sensor data in the spreadsheet 140 based on the location information for the temperature sensors 320 and the user selections. For example, referring to the table 100, cell locations are provided for each type of view. The cell locations are determined based on the location information for the temperature sensors 320. At step 730, the spreadsheet manager 110 performs mathematical functions on the temperature sensor data. The results of the mathematical functions may also be displayed, and locations for placing the results in the spreadsheet 140 may be predetermined or based on the location information of one or more temperature sensors.

At step 760, the spreadsheet manager 110 sends data, which may include temperature sensor data, the results of any calculations performed on the temperature sensor data and locations for placing the data in the spreadsheet 140 to the spreadsheet program 240. The spreadsheet program 240 places the data in the locations determined at step 750 and the view is generated.

At step 770, the spreadsheet manager 110 performs an action based on data in the spreadsheet 140. For example, a cell in the spreadsheet 140, for example, containing data transmitted from the spreadsheet manager 110 at step 760 is used as a sensor by the spreadsheet manager. If the data in the cell meets a predetermined condition, such as exceeding a threshold for a predetermined period of time, the spreadsheet manager 110 performs an action. The action may include controlling a device. For example, the spreadsheet manager 110 may instruct a cooling system to increase the speed of a blower to provide a greater amount of cooling fluid to a computer system.

One or more of the steps of the method 700 may be repeated substantially continuously, periodically or demand driven. These and other variations to the method 700 will be apparent to one of ordinary skill in the art.

Figure 8:
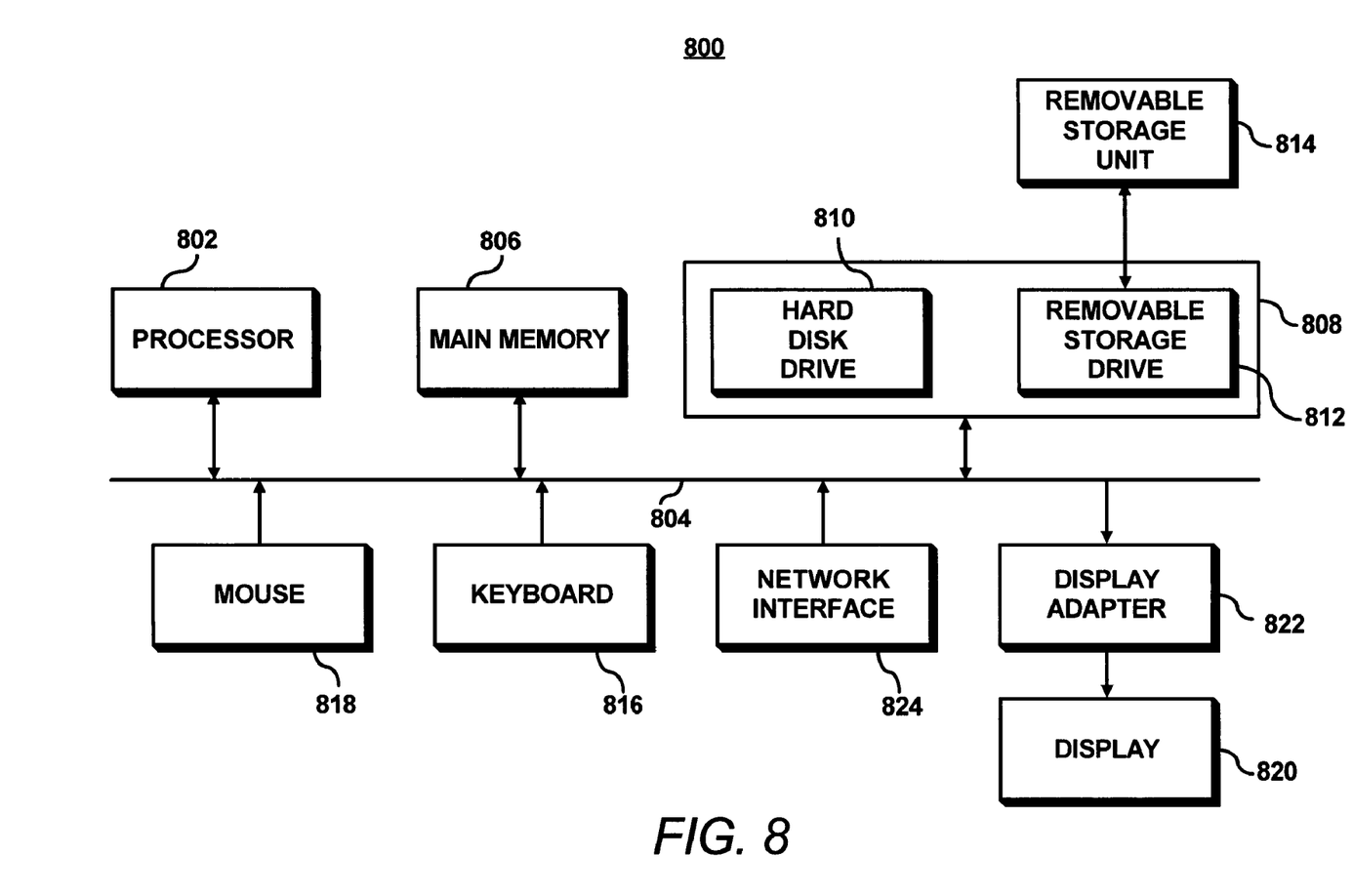
FIG. 8 illustrates a computing platform for the spreadsheet manager, according to an embodiment of the invention.

FIG. 8 illustrates an exemplary platform 800 for the spreadsheet manager 110. The software for the spreadsheet manager 110 may be executed on the platform 800. The platform 800, for example, includes one or more processors, such as processor 802. Commands and data from the processor 802 are communicated over a communication bus 804. The platform 800 also includes a main memory 806, such as a random access memory (RAM), where the program code for the spreadsheet manager 110 may be executed during runtime, and a secondary memory 808. The secondary memory 808 includes, for example, one or more hard disk drives 810 and/or a removable storage drive 812, representing a floppy diskette drive, a magnetic tape drive, a compact disk drive, etc., where a copy of the program code for the spreadsheet manager 110 may be stored. The removable storage drive 810 reads from and/or writes to a removable storage unit 814 in a well-known manner. User input and output devices may include a keyboard 816, a mouse or joystick 818, and a display 820. The display adaptor 822 interfaces with the communication bus 804 and the display 820 and receives display data from the processor 802 and converts the display data into display commands for the display 820. It will be apparent to one of ordinary skill in the arts that other known electrical components may be added or substituted in the platform 800. Also, one or more of the components in FIG. 8 may be optional (e.g., user input devices, secondary memory, etc.). A network interface 824 may also be included for communicating with other computer systems.

What has been described and illustrated herein are embodiments of the invention. The terms, descriptions and figures used herein are set forth by way of illustration only and are not meant as limitations. Those skilled in the art will recognize that many variations are possible within the spirit and scope of the invention.

What is claimed is:

1. A method implemented by a computerized system comprising:
   receiving data from a data source;
   determining a geographical location of the data source;
   determining a location in an electronic spreadsheet for placing at least a portion of the data, wherein the determined spreadsheet location is based on the determined geographical location of the data source;
   inserting the data portion in the electronic spreadsheet at the determined spreadsheet location; and
   displaying the electronic spreadsheet to a user, wherein the electronic spreadsheet indicates the geographical location of the data source from a display of the data portion inserted at the determined location.

2. The method of claim 1, further comprises:
   calculating, as a function of time, a value associated with the at least a portion of the data from the data source; and
   transmitting the value to a spreadsheet program for display in the electronic spreadsheet.

3. The method of claim 1, further comprising using the at least a portion of the data from the data source to control a device.

4. The method of claim 1, further comprising transmitting the at least a portion of the data and the location in the spreadsheet to a spreadsheet program, wherein the spreadsheet program is operable to display the at least a portion of the data at the location.

5. The method of claim 1, further comprising:
   calculating a total from the at least a portion of the data from the data source and at least a pardon of data from at least one other data source physically located proximate the data source; and
   determining a location in the spreadsheet for placing the total based on one or more of the location information for the data source and location information for the at least one other data source.

6. The method of claim 1, wherein determining a location in a spreadsheet based on the location information for the data source comprises mapping the location information for the data source to a predetermined location in the electronic spreadsheet.

7. The method of claim 1, further comprising:
identifying a view to be displayed in the spreadsheet;
determining whether the at least a portion of the data from the data source is in the view; and
transmitting the at least a portion of the data and the location in the electronic spreadsheet to a spreadsheet program in response to the at least a portion of the data being in the view, wherein the spreadsheet program is operable to display the at least a portion of the data at the location.

8. A method of using an electronic spreadsheet to display information at locations in the spreadsheet associated with the origin of the information, the method comprising;
receiving data from a plurality of sensors, each of the plurality of sensors situated at a separate geographical location;
determining the separate geographical location of each of the plurality of sensors;
determining locations in the spreadsheet based on the determined separate geographical locations of the plurality of sensors such that one or more of at least a portion of the data from each of the plurality of sensors and a value is operable to be displayed in one or more of the locations in the electronic spreadsheet, wherein the value is calculated from at least some of the data from the plurality of sensors;
inserting the data portion from each of the plurality of sensors in the electronic spreadsheet at each of the determined spreadsheet locations; and
providing a display in the electronic spreadsheet to a user at least one of the data portions inserted in one of the determined spreadsheet locations, wherein the display indicates the separate geographical location of one of the plurality of sensors.

9. The method of claim 8, further comprising:
calculating, as a function of time, the value; and
the step of determining locations in the spreadsheet comprises determining a location in the spreadsheet to display the value based on the location of at least one of the plurality of sensors.

10. The method of claim 8, further comprising controlling a device based on the value.

11. The method of claim 8, wherein the step of determining locations in the spreadsheet comprises:
selecting cells in the electronic spreadsheet to display at least one of the at least a portion of the data and the value.

12. The method of claim 8, further comprising transmitting the at least a portion of the data and the determined locations to a spreadsheet program, wherein the spreadsheet program is operable to display the at least a portion of the data in the determined locations.

13. The method of claim 8, further comprising:
dividing an area into a plurality of sections, the plurality of sensors being located in the area;
receiving a selection of a view including at least one of the plurality of sections;
determining whether any of the plurality of sensors are located in the at least one of the plurality of sections; and
transmitting data from the plurality of sensors located in the at least one of the plurality of sections and the determined locations for the plurality of sensors located in the at least one of the plurality of sections to a spreadsheet program operable to display the data from the plurality of sensors located in the at least one of the plurality of sections at the determined locations.

14. The method of claim 13, further comprising:
calculating a total from the data from at least some of the sensors located in the at least one of the plurality of sections; and
transmitting the total to a spreadsheet program operable to display the total at one of the determined locations associated with the at least some of the sensors.

15. The method of claim 8, wherein determining locations in the spreadsheet comprises mapping the locations of the plurality of sensors to predetermined locations in the electronic spreadsheet.

16. A system comprising:
a plurality of data sensors; and
a computing platform operable to identify a geographical location of each of the data sensors; the computing platform is further operable to designate locations in an electronic spreadsheet based on the identified geographical locations of the plurality of data sensors to display at the designated locations in the electronic spreadsheet at least one of the data from the plurality of sensors and a value calculated from the data from one or more of the plurality of sensors; and
wherein the computing platform conveys to a user, via the electronic spreadsheet, a display of the at least one data at one of the designated locations in the electronic spreadsheet to indicate the geographical location of at least one of the data sensors.

17. The system of claim 16, wherein the computing platform is operable to calculate the value as a function of time.

18. The system of claim 16, further comprising at least one other electronic spreadsheet operable to use data contained in the electronic spreadsheet to perform a mathematical function.

19. The system of claim 16, further comprising at least one device controlled by the computing platform based on the data from one or more of the plurality of data sensors.

20. The system of claim 16, further comprising a configuration repository storing the data from the plurality of data sensors and the locations in the electronic spreadsheet for placing the data from the plurality of data sensors, wherein the computing platform is operable to retrieve the locations in the electronic spreadsheet from the configuration repository to determine where to place the data from the plurality of data sensors in the electronic spreadsheet.

21. The system of claim 16, wherein the plurality of sensors comprises a plurality of sensors inn data center and the computing platform is operable to facilitate the placement of the data from The plurality of the sensors in the locations in the spreadsheet associated with locations of the plurality sensors in the data center.

22. The system of claim 21, wherein the computing platform is operable to facilitate the generation of different views of the sensors in the data center, the different views being provided in the spreadsheet.

23. An apparatus comprising:
means for receiving data from a plurality of sensors;
means for determining a geographical location of each of the plurality of sensors;
means for determining locations in an electronic spreadsheet based on the determined geographical locations of the plurality of sensors such that one or more of at least a portion of the data from each of the plurality of sensors and a value calculated from the data from one or more of the plurality of sensors is operable to be displayed in one or more of the determined locations in the electronic spreadsheet; and means for providing a display in the electronic spreadsheet to a user at least one of the data portions inserted in one of the determined spreadsheet locations, wherein the display indicates the geographical location of one of the plurality of sensors.

24. The apparatus of claim 23 further comprising means for calculating as a function of time the value.

25. The apparatus of claim 23, further comprising means for controlling a device based on the calculated value.

26. The apparatus of claim 23, further comprising storage means for storing the data from the sensors and the locations in the spreadsheet, wherein the means for determining the locations in the spreadsheet is operable to retrieve the locations in the spreadsheet from the storage means based on the locations of the plurality of sensors.

27. The apparatus of claim 23, further comprising means for receiving user selections associated with a view to be displayed in the spreadsheet, the view including at least one of the data from one or more of the plurality of sensors and the value.

28. A computer readable medium on which is embedded a program, the program performing a method, the method comprising:
   receiving data from a data source;
   determining a geographical location of the data source;
   determining a location in an electronic spreadsheet for placing at least a portion of the data, wherein the determined spreadsheet location is based on the determined geographical location of the data source;
   inserting the data portion in the electronic spreadsheet at the determined location; and
   displaying the electronic spreadsheet to a user, wherein the electronic spreadsheet indicates the geographical location of the data source from a display of the data pardon inserted at the determined spreadsheet location.

29. The computer readable medium of claim 28, wherein the method further comprises:
   calculating, as a function of time, a value associated with the at least a portion of the data from the data source; and
   transmitting the value to a spreadsheet program for display in the electronic spreadsheet.

30. The computer readable medium of claim 28, wherein the method further comprises the at least a portion of the data to control a device.

31. The computer readable medium of claim 28, wherein the method further comprises determining the location information for the data source, wherein the location information is associated with a geographical location of the data source.

32. The computer readable medium of claim 28, wherein the method further comprises transmitting the at least a portion of the data and the location in the electronic spreadsheet to a spreadsheet program, wherein the spreadsheet program is operable to display the at least a portion of the data at the location.

* * * * *

UNITED STATES PATENT AND TRADEMARK OFFICE
CERTIFICATE OF CORRECTION

| | | |
|---|---|---|
| PATENT NO. | : 7,930,626 B2 | Page 1 of 1 |
| APPLICATION NO. | : 10/697688 | |
| DATED | : April 19, 2011 | |
| INVENTOR(S) | : Bill Serra et al. | |

It is certified that error appears in the above-identified patent and that said Letters Patent is hereby corrected as shown below:

In column 12, line 56, in Claim 5, delete "pardon" and insert -- portion --, therefor.

In column 13, line 13, in Claim 8, delete "comprising;" and insert -- comprising: --, therefor.

In column 14, line 47, in Claim 21, delete "inn" and insert -- in a --, therefor.

In column 14, line 49, in Claim 21, delete "The" and insert -- the --, therefor.

In column 16, line 7, in Claim 28, delete "pardon" and insert -- portion --, therefor.

Signed and Sealed this
Twentieth Day of December, 2011

David J. Kappos
*Director of the United States Patent and Trademark Office*